United States Patent [19]
Frenkel

[11] Patent Number: 6,095,484
[45] Date of Patent: Aug. 1, 2000

[54] SPRING DIAPHRAGM FOR SHUT-OFF VALVES AND REGULATORS

[75] Inventor: Boris Frenkel, Netanya, Israel

[73] Assignee: Raphael Valves Industries (1975) Ltd., Israel

[21] Appl. No.: 08/984,345

[22] Filed: Dec. 3, 1997

[30] Foreign Application Priority Data

Jan. 5, 1997 [IL] Israel ........................................ 119963

[51] Int. Cl.⁷ ............................ F16K 7/17; F16K 31/126
[52] U.S. Cl. ...................... 251/61.1; 137/488; 251/331
[58] Field of Search ................... 251/61.1, 331; 137/488, 489, 489.5

[56] References Cited

U.S. PATENT DOCUMENTS

| | | |
|---|---|---|
| 2,302,930 | 11/1942 | Anderson . |
| 2,684,829 | 7/1954 | McFarland, Jr. ......................... 251/331 |
| 2,710,629 | 6/1955 | Price . |
| 2,840,339 | 6/1958 | Price ...................................... 251/331 |
| 3,011,758 | 12/1961 | McFarland, Jr. ......................... 251/331 |
| 3,067,764 | 12/1962 | Geary ..................................... 251/331 |
| 3,091,427 | 5/1963 | Boteler ................................... 251/331 |
| 3,130,954 | 4/1964 | McFarland, Jr. ......................... 251/331 |
| 3,310,282 | 3/1967 | Boteler ................................... 251/331 |

FOREIGN PATENT DOCUMENTS

| | | | |
|---|---|---|---|
| 693845 | 7/1953 | United Kingdom | ................... 251/331 |
| 2031122 | 4/1980 | United Kingdom . | |

*Primary Examiner*—George L. Walton
*Attorney, Agent, or Firm*—Galgano & Burke

[57] ABSTRACT

A spring diaphragm for use in automatic hydraulic control valves of the type having a valve body having an inlet chamber, and an outlet chamber and a spring diaphragm interposed between the inlet and outlet chambers, which spring diaphragm, as a result of hydraulic pressure, is automatically moveable between an open and closed position, in which the diaphragm allows and prevents, respectively, communication between the inlet and outlet chambers, includes a two-part diaphragm element including a first lower part and second upper part generally spaced apart from one another, the first lower part being in the form of a flexible elastic disc which performs the function of a hermetic seal between the inlet and outlet chambers when the spring diaphragm is in the closed position and the second upper part being connected to the first part and being in the form of a resilient disc which performs the function of a spring to normally bias the spring diaphragm from the open to the closed position. The first and second parts each have resilient spring-like ribs on the first lower part serving to aid hermetic sealing when the diaphragm is in the closed position and the ribs on the second upper part serve to provide a main force to bias the diaphragm into the closed position.

10 Claims, 4 Drawing Sheets

SPRING DIAPHRAGM FOR SHUT-OFF VALVES AND REGULATORS

FIELD AND BACKGROUND INVENTION

The present invention relates to diaphragm used in shut-off valves and regulators and more particularly to an improved spring diaphragm for shut-off valves and regulators for the hermetic separation of adjacent chambers of valves under pressure, as well as for the possibility of regulating the magnitude of the flow passing through a pipeline.

The spring diaphragm according to the invention is of unique construction, which will be referred to hereinafter as "two-storey diaphragm", can be employed in devices used in water-supply systems and in pipelines transporting petroleum, gas, various kinds of acids and bases, and other liquid mixtures and solutions.

A diaphragm which is intended for similar purposes and can be employed in similar devices is known (see "Fluid Controlling Diaphragm Valve," England, Classes: 135, Fick 7/16, No. 34131).

This diaphragm has the form a disk of molded shape made of rubber, at its center there is provided a bolt for joining the diaphragm to an actuator.

The outer shape of the diaphragm repeats the shape of the inner surface of the valve body, and the inner surface of the diaphragm corresponds to the outer surface of the actuator.

The top of the actuator is connected to a screw, which is screwed into a bushing, on which a handwheel is fixedly attached.

The ascent of the diaphragm into the upper position and its descent into its lower position are effected by rotating the handwheel in the clockwise and counterclockwise directions.

Hermetic sealing of the valve (separation of the entrance and exit chambers) is effected by tightly compressing the diaphragm against the surface of the valve body with the aid of the actuator.

One deficiency of such diaphragm is the fact that it can be operated (the valve can be opened and closed) only by manual control and can be employed only in shut-off valves.

Such a diaphragm design cannot be employed in regulator valves, i.e., in devices which automatically regulate the value of the pressure or pressure drop.

Another shortcoming of the design of this diaphragm is the fact that its operation requires a manual drive mechanism that includes several parts (an actuator, a screw, a bushing, and a handwheel), which increases the weight of the valve and the amount of work going into its manufacture and reduces the lifetime of the valve and its reliability during service.

The diaphragm design described in U.S. Pat. No. 2,302,930 which can be employed in similar devices for similar purposes, is also known. The design of this diaphragm is in the form of an elastic disk which transforms into a spherical surface. On the convex side of the spherical surface, which comes into contact with the surface of the valve body, there are hermetically sealing bands arranged along the perimeter of the elastic disk, which are joined to one another by an hermetically sealing band located on the symmetry axis of the diaphragm.

This diaphragm provides for valve operation (opening and closing) using an hydraulic drive mechanism and a metallic restoring spring placed over the diaphragm. A valve with a diaphragm of such construction opens (the diaphragm rises into the upper position) when there is positive pressure below the diaphragm. The valve closes (the diaphragm drops into the lower position until contact is made with the valve body) either under the action of the restoring spring (in the absence of pressure in the pipeline system) or when a pressure is supplied to the chamber above the diaphragm. When the pressures above and below the diaphragm are equal, the latter descends under the action of the restoring force of the metallic spring.

One deficiency of this diaphragm is the fact that at low pressure drops and low flow rates the presence of the metallic spring creates vibrations, which rapidly destroy the diaphragm and render the valve ineffective.

Another deficiency of this design is the fact that the restoring force of the spring must be overcome to completely open the valve, and, as a result, there is an increase in the value of the minimal pressure needed to completely open the valve.

A third deficiency of this design is the presence of the spring and its seat, which complicates the design of the valve as a whole and its assembly and shortens the lifetime of both the diaphragm and the valve as a whole.

The diaphragm described in Israeli Application No. 62466 (Improved Diaphragm for Valves, Apr. 30, 1993) is also known. Its appearance resembles the diaphragm described in U.S. Pat. No. 2,302,930; however, this diaphragm is distinguished by the presence of radial and annular ribs on its concave surface, which perform the role of a metallic spring and replace the latter.

This diaphragm eliminates all the deficiencies described above and has several significant advantages over them.

This diaphragm design is very efficient when it is employed in valves with through apertures of relatively small nominal diameters (from ½" to 8").

In valves with larger nominal apertures (more than 8") there is a sharp increase in the active area of the diaphragm, which, in turn, requires an increase in the geometric dimensions (width and height) of the ribs arranged on the concave surface of the diaphragm.

One deficiency of this technical solution is the need to increase the minimal pressure required to open the valve, i.e., the hydraulic characteristics of the valve become poorer.

OBJECTS OF INVENTION

It is thus the object of the present invention to provide a diaphragm for valves of large nominal apertures which does not have said deficiency.

The object of the invention is achieved by constructing a diaphragm in the form of a flexible elastic disk consisting of two storeys connected to one another. The lower part, which performs the function of an hermetic seal that separates the inlet and outlet chambers of the valve, interacts with the inner surfaces of the valve body and the bonnet, and the upper part, which performs the function of a spring, interacts with the inner surface of the bonnet and the concave surface of the lower part of the disk.

In order to increase the lifetime, springy ribs which create the force and the unit pressure needed to ensure hermetic sealing between the diaphragm and the valve body are provided on the curvilinear concave surface of the lower part of the flexible elastic disk, and ribs which create only the force needed to return the diaphragm from the uppermost position (the state of an opened valve) to the lower position (the state of a closed valve) are arranged on the upper part of the flexible elastic disk.

SHORT DESCRIPTION OF DRAWINGS

The invention will now be described with reference to the annexed drawings in which.

DESCRIPTION OF PREFERRED EMBODIMENT

Figure 1:
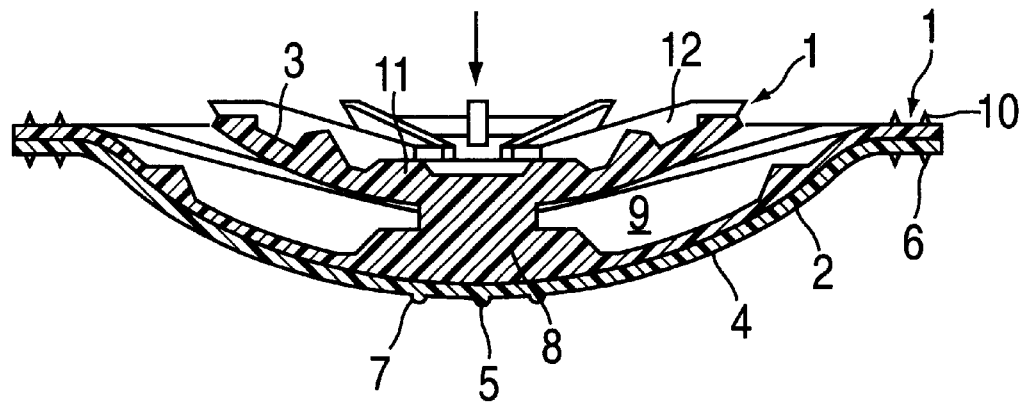
FIG. 1 shows the design of the diaphragm according to the invention in cross section.

The diaphragm seen in FIG. 1 consists of flexible elastic disk 1, which is constructed in the form of two parts joined to one another, i.e., lower part 2 and upper part 3.

Within the lower part there is a scarcely deformable, thin stiff elastic sheet 4, for example, of cotton or nylon, which imparts the necessary stiffness to the diaphragm operating under pressure.

On the convex surface of the lower part 2 there is provided a central hermetically sealing ridge 5, which is joined to annular hermetically sealing ridges 6, with the aid of which hermetic sealing is ensured between the diaphragm and the valve body.

On both sides of the hermetically sealing ridge 5 there are provided ribs 7, which are intended for damping the noise and vibrations appearing during operation of the valve.

In the central part of the concave surface of the lower part 2 there is a solid disk 8, from which springy ribs 9 branch out in the radial direction at equal distances from one another.

The radically arranged, springy ribs 9 create the force and unit pressure needed to ensure hermetic sealing between the diaphragm and the inner surface of the valve body.

Beyond the radial ribs 9 there are annular hermetically sealing ridges 10, which serve to ensure hermetic sealing between the diaphragm and the valve bonnet.

The convex part of the upper part 3 is joined to the solid disk 8, which is located on the lower part of the flexible elastic disk.

In the central section of the concave surface of the upper part of the flexible elastic disk there is a ring 11, which is made as a single unit together with the concave surface of the upper part, from which springy ribs 12 branch out in the radial direction. The latter create only the force needed to return the diaphragm from the uppermost position to the lower position.

On the flat surface of the lower layer of the diaphragm there are provided holes 13, through which the bolts which fasten the bonnet and the diaphragm to the valve body pass.

Bearing areas 14 (FIG. 2), which come into contact with ribs located in the valve body, are provided on the convex surface of the lower part on both sides the hermetically sealing band perpendicularly to its axis.

The fundamental significant difference between the design of the proposed diaphragm and all the known valves is that the functions of the springy ribs are clearly demarcated in it. More specifically:

the springy ribs located on the lower part create the force needed to ensure hermetic sealing of the valve;

the springy ribs located on the upper part create the force needed to return the raised diaphragm to the lower position.

A positive effect greater than the sum of the component parts is achieved in such a design embodiment, since it creates the possibility for maintaining the minimal pressure needed to raise the diaphragm to the uppermost position and for maximally increasing the area of the aperture cross section without increasing its weight, while the lifetime of the diaphragm increases.

Figure 2:
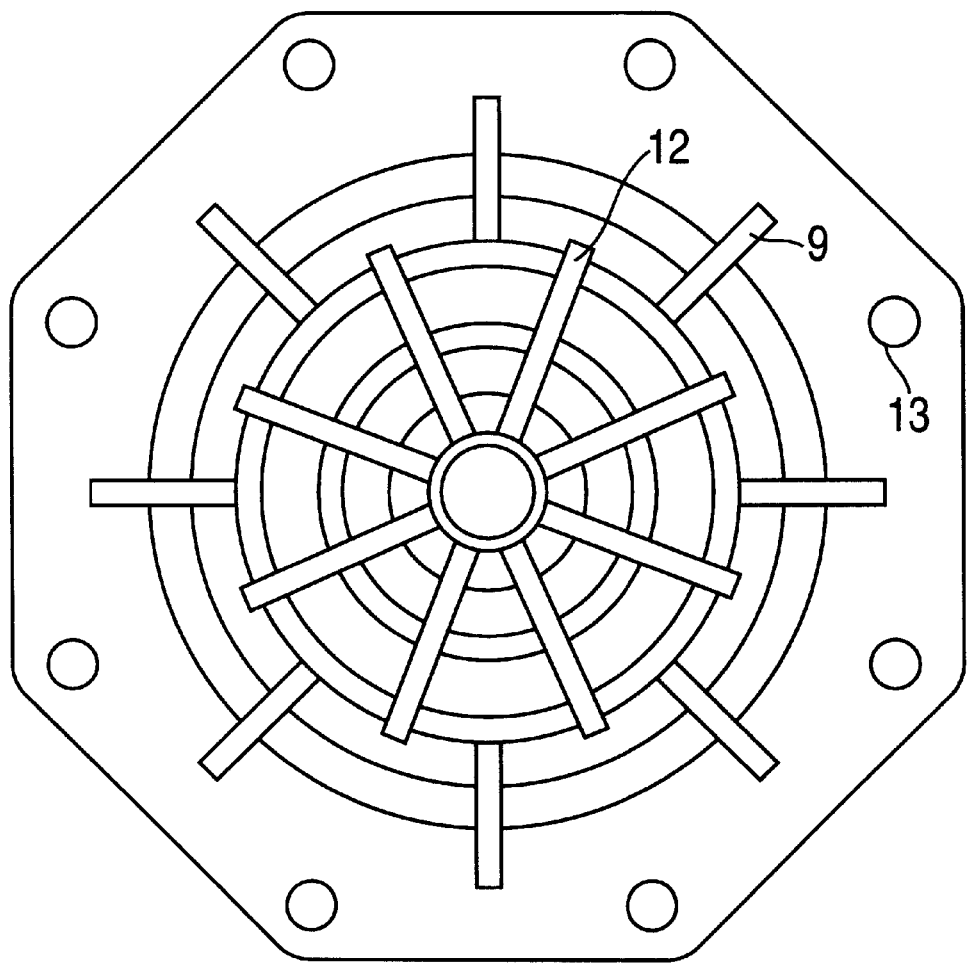
FIG. 2 is a top view of FIG. 1.

In order to simplify the manufacturing technology, the diaphragm can be constructed as separable components (FIG. 2).

In this case the lower part 2 and the upper part 3 are made separately, and then joined to form a single unit with the aid of fastening elements; a screw bolt 15 and disk 16, To make such joining possible, metallic bushing 17, into which screw bolt 15 is screwed, is provided at the center of the lower part.

Such a sectional embodiment of a diaphragm consisting of two separate parts does not alter the essence of the invention and the operating principle of the diaphragm.

The diaphragm operates in the following manner (in the example case of a shut-off valve which performs an opening-closing function).

The two-storeys diaphragm 1 (FIG. 3) is placed on flange 18 of the valve body and covered by bonnet 19 from above.

The diaphragm is tightly compressed between the bonnet and the valve body with the aid of bolt 20 to ensure hermetic sealing of the joint.

Three-way valve 21, with the aid of which the operation of the diaphragm is obtained, is placed on the bonnet.

The idea is that in the through aperture of the valve body there is constantly a pressure $P_1$ on the inlet side, and a pressure $P_2$ on the outlet side, and the diaphragm is in the lowermost position (the valve is closed).

In this case the handle of the three-way valve is placed in position A, in which the pressure $P_1$ is supplied through pipe 22 to the compartment over the diaphragm. In this case the hermetically sealing ridge 5 is tightly pressed against bearing surface 23 in the valve body by the force created by the pressure $P_3$ and the force $T_9$ created by the springy ribs 9.

It is very important that at this moment the springy ribs 12 located on the upper part of the diaphragm do not participate in the process of hermetically sealing the valve, since it is in the free state, and this is necessary, since it is clear from the equality $$P_1 \cdot F_1/2 < P_3 \cdot F_1 °T_9 \qquad (1)$$

that $P_1$ acts on half of the active area of the diaphragm when the valve is closed.

If it is assumed that the effective areas of the diaphragm $F_1$, from above and below are equal, it follows from inequality (1) that the total force stemming from the action of the pressure $P_3$ on the area $F_1$ ($P3 \cdot F_1$) and from the action of the springy ribs 9 ($T_9$) is significantly greater than the force acting on the diaphragm from below ($P_1 \cdot F/2$), owing to which separation of the inlet and outlet compartments in the valve occurs, i.e., in this situation the valve is always closed, since the hermetically sealing ridge 5 is tightly pressed against the bearing surface 23 in the valve body in this situation.

In the case in which the pressure $P_3 = P_1$ acts on the diaphragm from above, the pressure at the exit is $P_2 = 0$, and the diaphragm tends to turn into a position in which part of the area on the outlet side is lower than the part of the area on the inlet side.

In order to eliminate the possibility of such fuming, bearing areas 14 were provided on the diaphragm (FIG. 2). When the diaphragm descends, they lie on rib bearing surface 24 in the valve body.

In addition, the bearing areas 14 increase the cross section of the diaphragm and imparts greater strength to it in these places.

Figure 3:
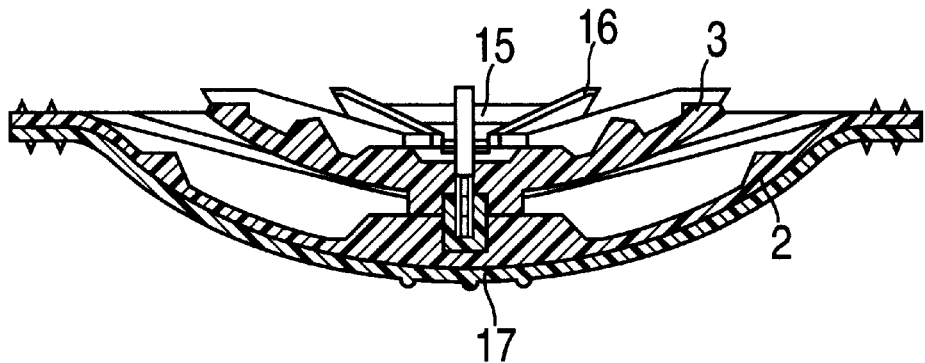
FIG. 3 shows a variant of the design of the diaphragm, in which the flexible elastic disk is constructed of two separate parts, which are joined to one another by fastening elements.

In order to open the valve, the handle of the three-way valve 21 must be turned to position B (this is illustrated by the dotted line in FIG. 3).

In this position the flow from the inlet side (the pressure $P_1$) is blocked (the pressure $P_1$ does not reach the chamber over the diaphragm), and the chamber over the diaphragm is open to the atmosphere, i.e., $P_3=0$.

Under the action of the pressure $P_1$ a force appears on half of the area of the convex part of the diaphragm ($P_1 \cdot F$), which begins to move the diaphragm upward until the through aperture of the valve is opened completely.

When the diaphragm rises, the springy ribs 9 stretch, and tensile stresses appear in them, which tend to return the diaphragm to its original (lower) position, but this force need not provide for the return of diaphragm to the lower position, since according to the scheme of the design proposed in the present application (and this is the main point of the invention), this force should basically ensure only hermetic sealing of the valve in the closed position.

Figure 4:
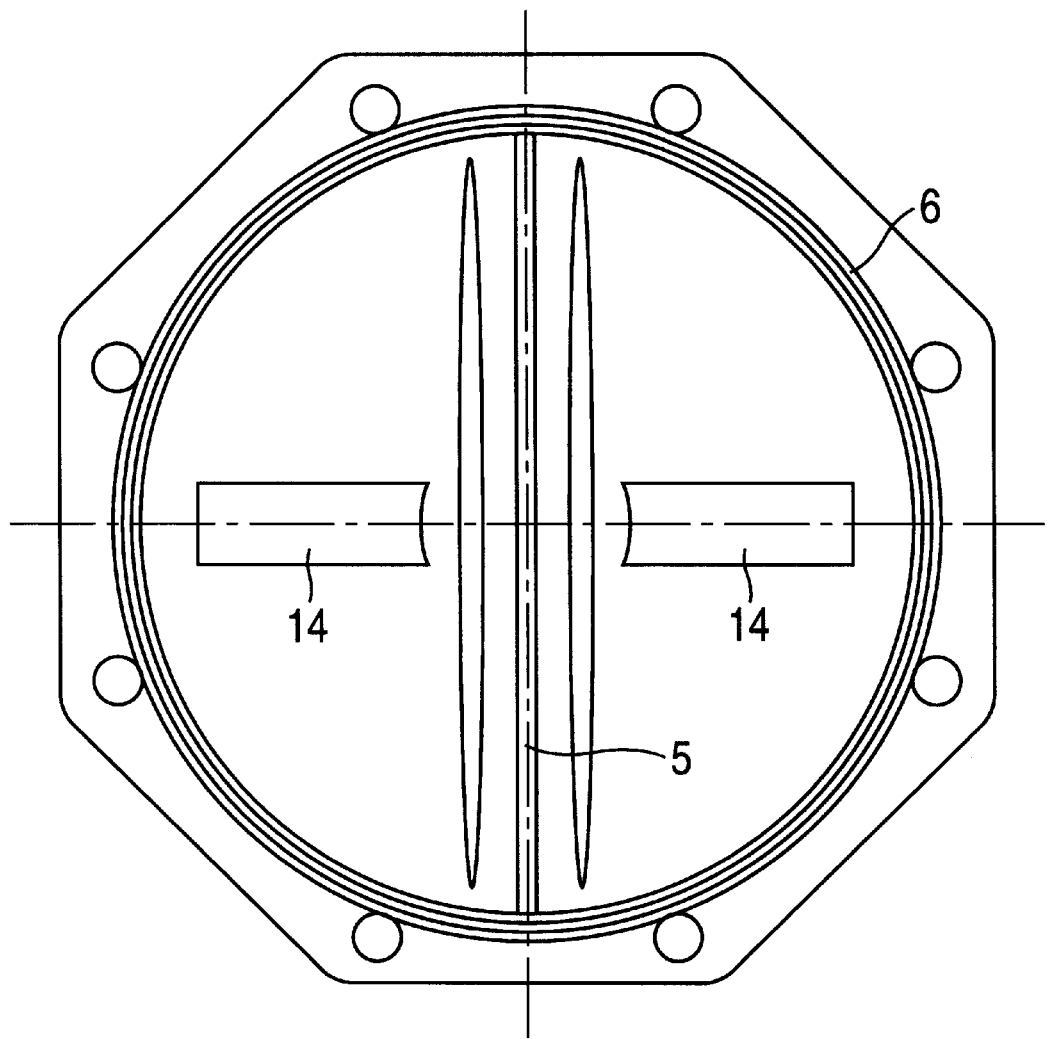
FIG. 4 is an underneath view of FIG. 3.

As soon as the diaphragm rises to the position in which the upper part touches the inner surface of the bonnet, the springy ribs 12 go into operation (see FIG. 4).

Figure 5:
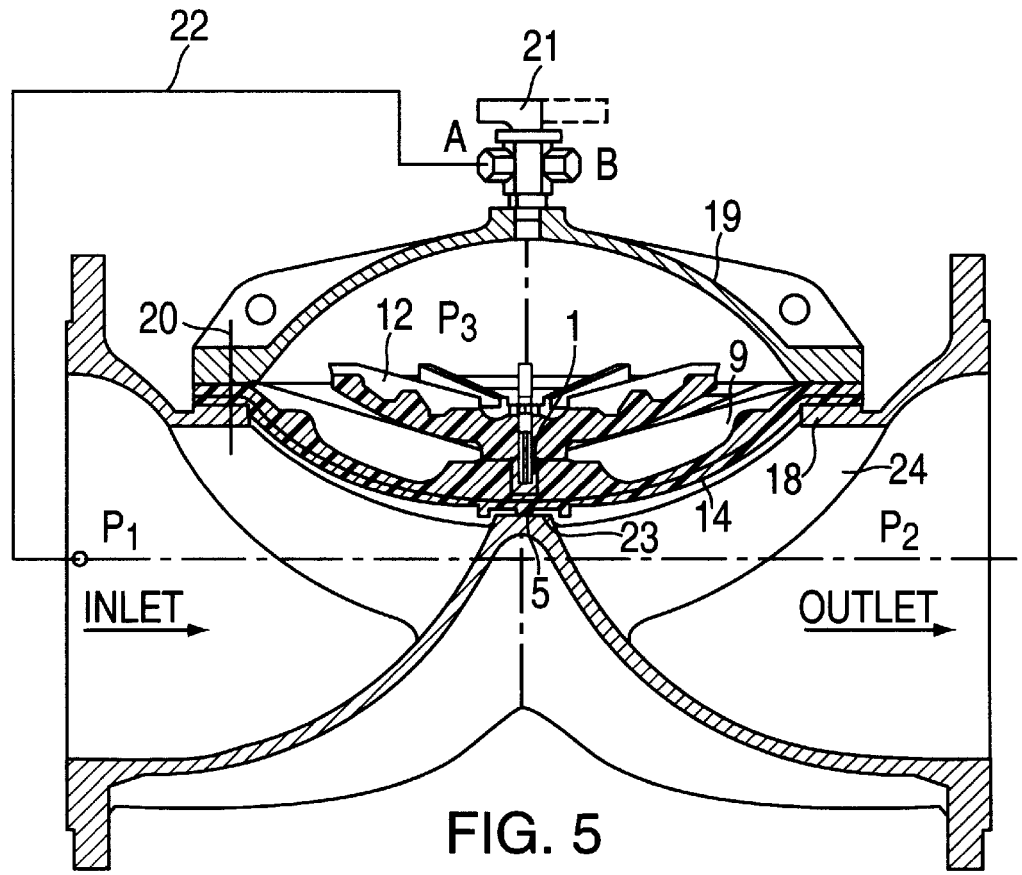
FIG. 5 shows the diaphragm installed in an assembled shut-off valve in its lowermost position (the valve is closed).
Figure 6:
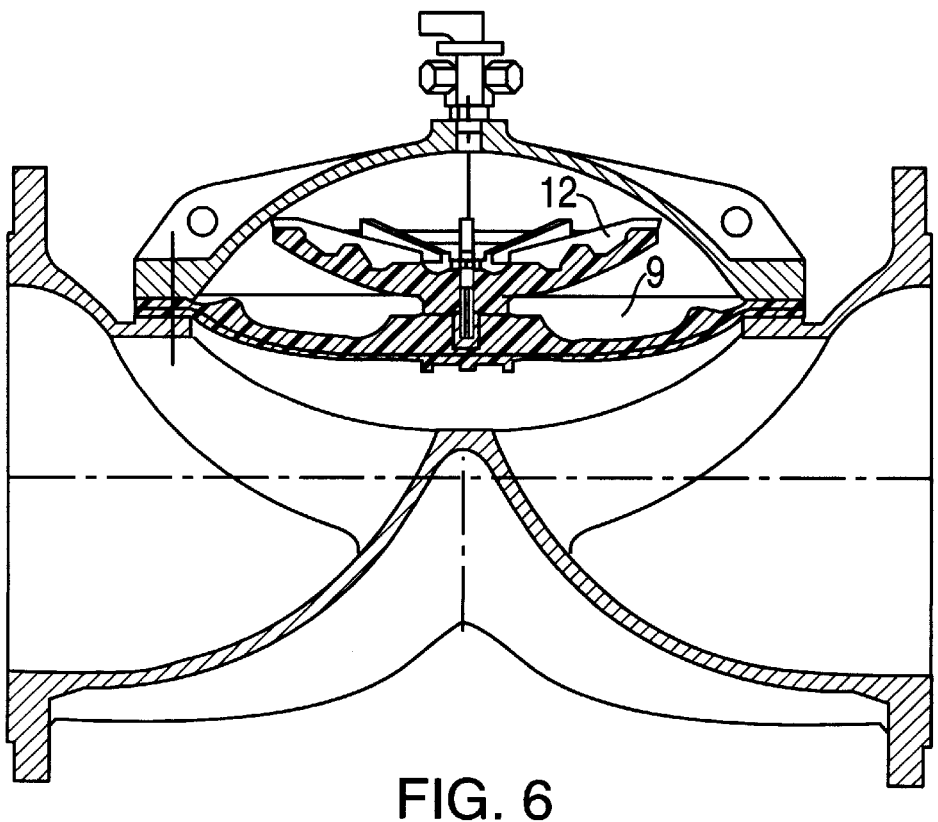
FIG. 6 shows the diaphragm in a position in which the upper part of the flexible elastic disk is in contact with the inner surface of the valve bonnet.
Figure 7:
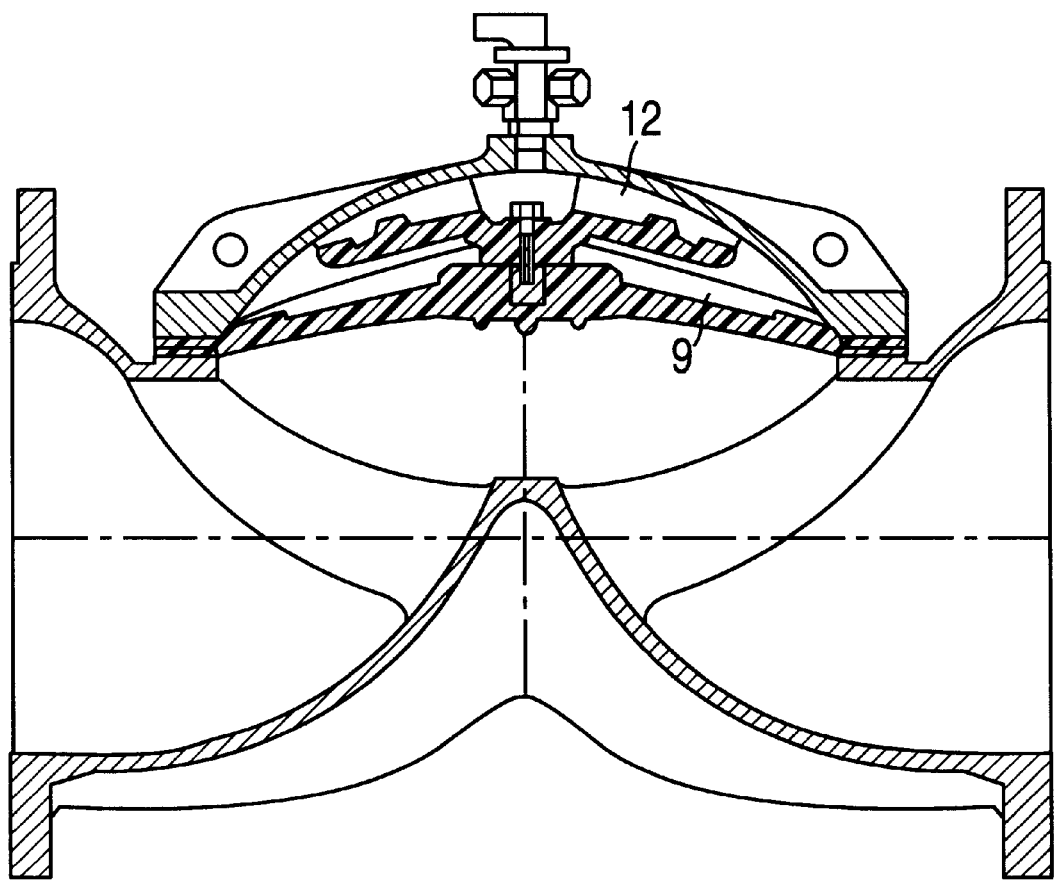
FIG. 7 shows the diaphragm in the uppermost position (the valve is completely opened).

When the diaphragm rises further (FIG. 5), the springy ribs 12 begin to stretch, and tensile stresses appear in them, which also create the main force that returns the diaphragm to its initial position. The springy ribs 9 also create an additional force, which tends to return the diaphragm to its initial position.

To close the valve (to lower the diaphragm) the handle of the three-way valve 21 must be moved into position A, in which the pressure $P_1$ is supplied to the chamber over the diaphragm, and the channel connecting this chamber with the atmosphere is blocked.

The relation between the forces acting in this situation is expressed by the following inequality:

$$P_3 \cdot F + T_9 + T_{12} > (P_1 + P_2)F \qquad (2)$$

Since $P_3 = P_1$ and $P_1 \geq P_2$, it is clear from inequality (2) that the force acting on the diaphragm from above will always be greater than the force acting on the diaphragm from below.

The force $T_{12}$ created by the springy ribs 12 will continue to act as long as they are in contact with the inner surface of the bonnet.

When the diaphragm descends further, the springy ribs 12 on the upper layer cease to make contact with the inner surface of the bonnet, $T_{12}=0$, and the further descent of the diaphragm to its initial position takes place under the action of the force created by the pressure $P_3$ and the force of the springy ribs 9.

It is seen from the description that as the diaphragm rises to the uppermost position, the forces created by the springy ribs of both parts are summed at a definite moment and that as the diaphragm descends to the lowermost position, the force created by the springy rings 12 of the upper part becomes equal to zero at a definite moment.

Such embodiment makes it possible to maintain the minimal pressure needed to open the valve and, at the same time, to create the force needed to return the diaphragm to the lowermost position.

A valve design with a minimal pressure for opening the valve and a maximal aperture cross-sectional area without an increase in weight can be developed by varying the geometric dimensions of the surface of the upper part and the springy ribs located on it while leaving the geometric dimensions of the lower part of the diaphragm unchanged.

At the same, the lifetime of the diaphragm increases, since, first, the forces created by the springy ribs of the supper and lower parts of the diaphragm are demarcated and, second, there is a possibility for replacing only one part of the diaphragm (upper or lower) in the case of a separable sectional design.

I claim:

1. A spring diaphragm for use in automatic hydraulic control valves of the type having a valve body having an inlet chamber, and an outlet chamber and a spring diaphragm interposed between said inlet and outlet chambers, which spring diaphragm, as a result of hydraulic pressure, is automatically moveable between an open and closed position, in which said diaphragm allows and prevents, respectively, communication between said inlet and outlet chambers, comprising:

a two-part diaphragm element including a first upper part and second lower part generally spaced apart from one another, said first lower part being in the form of a flexible elastic disc which performs the function of a hermetic seal between said inlet and outlet chambers when said spring diaphragm is in said closed position and said second upper part being connected to said first part and being in the form of a resilient disc which performs the function of a spring to normally bias said spring diaphragm from said open to said closed position, said first and second parts each having resilient spring-like ribs, said ribs on said first lower part serving to aid hermetic sealing when said diaphragm is in said closed position and said ribs on said second upper part serving to provide a main force to bias the diaphragm into said closed position.

2. A spring diaphragm as claimed in claim 1, wherein said lower part is constructed in the form of a flexible elastic disk which smoothly transforms into a spherical surface and within said flexible elastic disk there is a stiff, scarcely deformable, thin elastic sheet.

3. A spring diaphragm as claimed in claim 2, wherein said elastic sheet is made of a material selected from the group consisting of cotton and rayon.

4. A spring diaphragm as claimed in claim 1, wherein on the surface of said flexible elastic disk of said lower part there are integrally-formed, hermetically sealing ridges.

5. A spring diaphragm as claimed in claim 1, wherein said upper and lower parts each have a normally concave upper surface and convex lower surface and wherein said ribs on said lower part which create the force and unit pressure needed to ensure hermetic sealing between the diaphragm and the value body are provided on said concave surface of the lower part and wherein said ribs on said upper part which create only the force needed to return the diaphragm from the open position to the closed position (the state of a closed valve) are arranged on said concave surface of said upper part.

6. A spring diaphragm as claimed in claim 4, wherein said valve body has bearing ribs and said diaphragm additionally includes bearing areas disposed on said convex surface of said lower part which interact with said bearing ribs in the valve body at the moment when the valve is closed, and there is a pressure in the chamber over the diaphragm.

7. A spring diaphragm as claimed in claim 1, wherein said valve body has a valve bonnet with an inner surface and said upper part is constructed in such a manner that the force needed to return the diaphragm to the closed position appears only at the moment when the upper part contacts said inner surface of the valve bonnet.

8. A spring diaphragm as claimed in claim 1, wherein said upper and lower parts are formed as one piece.

9. A spring diaphragm as claimed in claim 1, wherein said ribs are arranged on the lower and upper parts to create a uniformly distributed force over the entire active surface of the diaphragm.

10. A spring diaphragm as claimed in claim 1, wherein said upper and lower parts are separate parts and said diaphragm further includes means for fastening said upper and lower parts to one another.

* * * * *